United States Patent Office 3,434,749
Patented Mar. 25, 1969

3,434,749
CORNER CONNECTION ESPECIALLY FOR PRODUCING FRAMES FOR WINDOWS AND AQUARIUMS
Willy Meyer, 3091 Brammer 17, Germany
Filed June 23, 1966, Ser. No. 559,977
Int. Cl. F16b 5/00, 13/00
U.S. Cl. 287—189.36                           2 Claims

ABSTRACT OF THE DISCLOSURE

A corner connection, especially for producing frames for windows and aquariums, which includes abutting strip sections forming a corner with each other and respectively being provided with groove means having bores therein of a diameter in excess of the width of the respective groove means, said pores being perpendicular to the bottom of the groove means and being arranged in spaced relationship to the area of mutual abutment while being engaged by approximately cylindrical end parts of anchor means, said bores being spaced from said area of abutment by such a distance that said anchor means with said cylindrical end parts in said bores will be under a pretension whereby said abutting strip sections are firmly clamped against each other.

---

The present invention concerns a corner connection of strip or bar sections which at least within the corner area are provided with grooves extending substantially parallel to the longitudinal axes of the respective strips or bars, especially for making frames or windows and aquariums. In this respect it is known to make corner connections in such a way that the strip sections which may be provided with a miter or bevel are connected to each other by angle-shaped sheet metal corners or plates, said angle-shaped plates being screwed onto the strip sections within the corner area.

It is also known to insert metallic angles into grooves extending parallel to the longitudinal axes of the strips, which angles are screwed into, riveted, pressed, or provided with special springs pre-loading and securing the said metal angles in said grooves in order to assure a pre-load and safe connection of the strip sections forming a corner.

These types of connection require relatively much work. The employment of angle plates and screws furthermore require that the angle plates be countersunk in order to obtain a smooth outer surface of the angle. In addition thereto, the said angle plates have to be fastened by screws. Simple screw connections require bores which are either at an incline to the connecting surface or to the strips to be interconnected. In case if provided bores are to be interconnected, it is frequently rather difficult, so to locate the bores that they will remain in the strip bodies.

It is, therefore, an object of the present invention to provide a corner connection for strips, bars, or the like, which will overcome the above-mentioned drawbacks.

It is another object of this invention to provide a corner connection as set forth above, which is of a particularly simple construction and can easily be effected.

These and other objects and advantages of the invention will appear more clearly from the following specification in connection with the accompanying drawings, in which.

Figure 3:
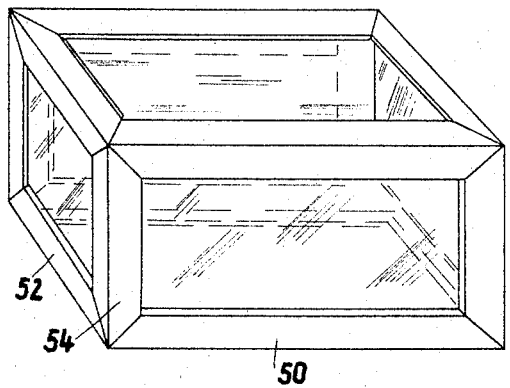
FIGURE 3 is an isometric view of an aquarium in which the frames holding the glass panes have incorporated therein corner connections according to the present invention.
Figure 4:
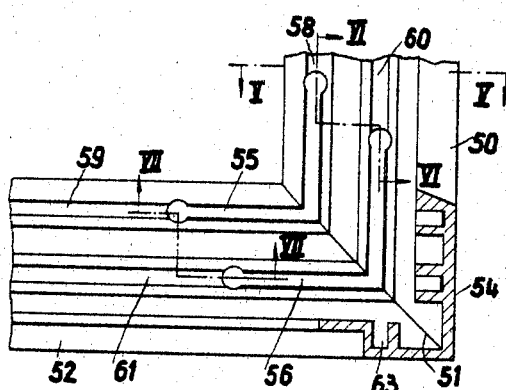

FIGURES 4 to 7 respectively illustrate corner connections of the aquarium according to FIG. 3. More specifically, FIG. 4 is a section taken along the line IV—IV of FIG. 5.

Figure 5:
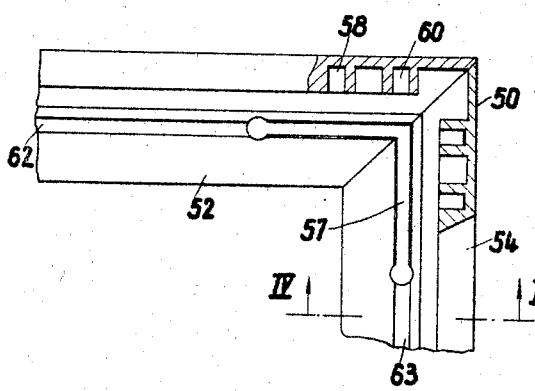

FIGURE 5 is a section taken along the line V—V of FIGURE 4.

Figure 6:
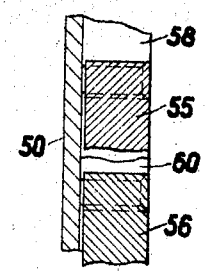

FIGURE 6 is a section taken along the line VI—VI of FIG. 4.

Figure 7:
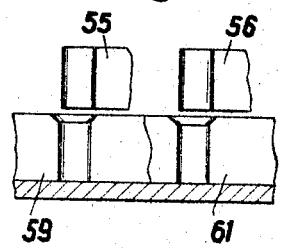

FIGURE 7 is a section taken along the line of VII—VII of FIG. 4.

The corner connection according to the present invention is characterized primarily in that the grooves in the strip sections to be interconnected are at spaced places widened by bores, and that angle-shaped anchor members are inserted into aligned grooves. These anchor members engage the broadened bored portion of the grooves by means of cylindrical end sections of said anchor members. The longitudinal axes of said cylindrical end sections and of the bored broadened sections are perpendicular to the plane receiving the respective strip sections.

As will be evident from the above, the individual strip sections can after a simple preparing operation such as the drilling of the bored widening sections be composed to corner connections by means of inserting the anchor members into the grooves.

Preferably, the spacing between the said bores are with regard to the length of the anchor members so dimensioned that when assembling the anchor members, the latter will be under a pre-load. To this end, the said bores may at the upper ends be slightly widened, or the ends of the cylindrical end parts first to enter the bores are tapered. In view of the thus obtained pre-load, a special means for securing the angle-shaped anchor members will be superfluous.

Figure 1:
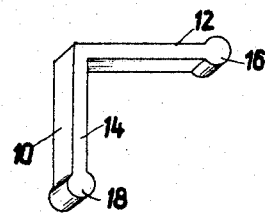
FIGURE 1 is an isometric view of an anchoring member according to the present invention.

Referring now to the drawings in detail, the anchor member 10 shown in FIG. 1 is a rectangularly shaped member with legs 12 and 14. Preferably, the anchor member is made of a resistant material such as non-rusting or stainless steel, or of a resistant light metal alloy as for instance. For purposes of connecting strips of synthetic material, an anchor of synthetic material as for instance, may be employed.

Legs 12 and 14 are preferably of the same length and have a rectangular cross section. The ends of legs 12 and 14 are provided with cylindrical bead portions 16 and 18 respectively. The axes of the cylinders of said end portions 16 and 18 are substantially perpendicular to the plane defined by both legs 12, 14.

Figure 2:
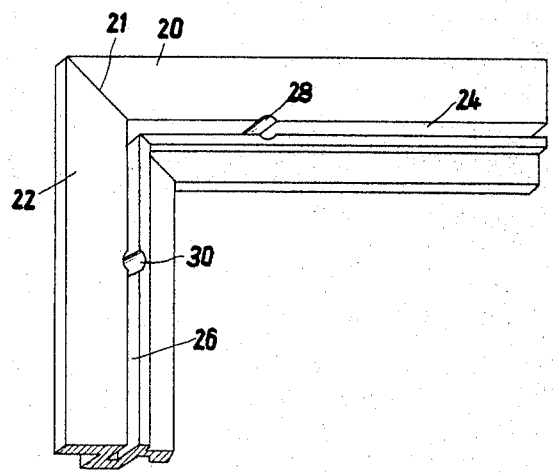
FIGURE 2 represents a corner formed by prepared strips for receiving an anchor according to the present invention.

FIGURE 2 shows a corner formed by strip sections 20 and 22 which are adapted to receive the anchor 10. To this end, the strip sections 20 and 22 are cut to a miter so that they join along the surface 21 at an angle of 45 degrees. The strip sections 20, 22 form portions of a profiled rail as it may be used, for instance, in connection with the manufacture of metallic window frames and which is usually produced by extrusion pressing light metal. The profile of the strip section 20 has a groove 24 while the strip section 22 has a groove 26, the said grooves leading into each other at the joint 21. The cross section of grooves 24, 26 corresponds to the cross section of the legs 12, 14. For receiving the end portions 16, 18 the grooves are bored at 28 and 30 respectively so that the end portions 16, 18 of anchor member 10 can be inserted with a press fit into the correspondingly prepared bores 28, 30 of the grooves in the strip sections whereby the corner connection is secured.

From the above, it will be evident that the invention is particularly suitable for making window frames of profiled rails which in their turn may consist of extrusion pressed light metal.

However, the corner connection according to the present invention is not limited to the production of plane frames but can also be used for making three-dimensional frames as employed, for instance, for the production of aquariums, terrariems, glass casings and the like.

FIGS. 4 to 6 illustrate details of a corner pertaining to an aquarium illustrated in FIG. 3. The strips 50 and 52 used in this instance for the horizontal strips each have a relatively wide horizontal leg. The strips, therefore, each has two grooves 58, 60, 59, 61 in the respective horizontal leg which merge with each other at the joint 51 where the wide horizontal legs abut. Strips 50 and 52 are interconnected by the two anchor members 55 and 56 which are pressed into grooves 58, 59 and 60, 61. The symmetric strips 54 which primarily form the vertical corner sections have their two legs each adapted to receive the bead of an anchor member. The vertical leg of each of strips 50 and 52 and the respective abutting leg of strip 54 are interconnected by anchor members 57 one of which is shown located in the grooves 62 and 63 of strips 52 and 54. Preferably, the grooves in the strips 50, 52, and 54 are on the inside so the strips will present an uninterrupted surface to the outside, as seen in FIG. 3.

FIGS. 6 and 7 each show a section of the corner connection according to FIG. 4, and more specifically in FIG. 6 prior to, and in FIG. 7 after the insertion of the anchor members 55 and 56.

The bores in the individual grooves are preferably so arranged, and the individual anchor members are so dimentioned that the anchor members must be inserted under pre-load into the respective space. This may, for instance, be realized by widening the upper portion of the bores in a conical way so that when driving in the anchor members, a pre-load will be the result. In this way, an extremely tight connection of the strips forming the respective corner will be obtained. In this way, it is possible to interconnect the two strips without resorting to any cementing. Of course, it is also possible additionally to cement the strips together in which instance the advantage is obtained that it is not necessary to wait until the cement has hardened before a further machining or pressing of the corner connection may be effected.

What is claimed is:

1. In combination: at least two strip-like frame members arranged at an angle to each other with their one ends in abutting engagement and a connecting member connecting the frame members together, said combination being especially adapted for producing frames for windows and aquariums each of said frame members being provided with at least one groove means formed into one side of the respective frame member and extending from said one end of the respective frame member longitudinally of the frame member in a direction away from said one end thereof, each of said groove means being rectangular in cross-section and having a laterally enlarged region therein spaced from the said one end of the respective frame member, each of said laterally enlarged regions defining a bore forming first shoulder means facing away from the said one end of the respective frame member and in a plane substantially perpendicular to the bottom surface of said groove means, said groove means meeting and registering where said one ends of the frame members abut so as to form a single angular groove, said connecting member comprising an angular web portion rectangular in cross-section and forming two leg portions respectively disposed in and relatively closely fitting said registering groove means forming a single angular groove, said connecting member also comprising laterally enlarged portions on the ends of said leg portions disposed in said bores, each of said laterally enlarged portions defining second shoulder means facing the respective adjacent first shoulder means, said enlarged portions on the ends of the leg portions being substantially parallel and of about the same cross-section as said bores, the length of the said leg portions of said connecting member and the spacing of said first shoulder means from the said one ends of the said frame members being so selected that said connecting member disposed in said angular groove is under pull stresses thereby holding the said one ends of said frame members firmly clamped together in a predetermined position under a preload, at least one of said first and second shoulder means having an incline on that portion thereof which first engages the other thereof when said connecting member is introduced into said angular groove thereby to facilitate insertion of said connecting member into said angular groove.

2. The combination according to claim 1 in which said enlarged portions on the ends of the leg portions of said connecting member are substantially cylindrical, said incline being in the form of a chamfer at the mouth of each of said bores.

References Cited

UNITED STATES PATENTS

| | | |
|---|---|---|
| 111,128 | 1/1871 | Linscott. |
| 1,089,360 | 3/1914 | Goodrow. |
| 2,101,349 | 12/1937 | Sharp. |
| 2,371,493 | 3/1945 | Aschinger. |
| 2,996,159 | 8/1961 | Casebolt. |
| 3,200,913 | 8/1965 | Nelson. |

FOREIGN PATENTS

| | | |
|---|---|---|
| 912,176 | 4/1946 | France. |
| 1,286,367 | 1/1962 | France. |
| 196,935 | 7/1938 | Switzerland. |

MARION PARSONS, JR., *Primary Examiner.*